United States Patent [19]
Strait, Jr.

[11] Patent Number: 4,718,745
[45] Date of Patent: * Jan. 12, 1988

[54] OPTICAL FIBER CONNECTOR

[75] Inventor: Ross W. Strait, Jr., Madison, Conn.

[73] Assignee: Times Fiber Communmications, Inc., Wallingford, Conn.

[*] Notice: The portion of the term of this patent subsequent to Sep. 30, 2003 has been disclaimed.

[21] Appl. No.: 628,518

[22] Filed: Jul. 6, 1984

Related U.S. Application Data

[63] Continuation-in-part of Ser. No. 503,165, Jun. 10, 1983, Pat. No. 4,614,401.

[51] Int. Cl.⁴ .............................................. G02B 6/36
[52] U.S. Cl. ........................... 350/96.21; 350/96.10; 350/96.20
[58] Field of Search ................. 350/96.20, 96.21, 96.22

[56] References Cited

U.S. PATENT DOCUMENTS

| | | | |
|---|---|---|---|
| 4,019,241 | 4/1977 | Logan | 350/96.21 X |
| 4,047,496 | 9/1977 | Kao et al. | 350/96.21 |
| 4,050,781 | 9/1977 | Beauhaire | 350/96.21 |
| 4,056,305 | 11/1977 | McCartney et al. | 350/96.21 |
| 4,061,416 | 12/1977 | Stewart | 350/96.21 |
| 4,123,139 | 10/1978 | Sandahl | 350/96.21 |
| 4,161,347 | 7/1979 | Tardy | 350/96.21 |
| 4,201,444 | 5/1980 | McCartney et al. | 350/96.21 |
| 4,345,137 | 8/1982 | Mignien et al. | 350/96.21 X |
| 4,614,401 | 9/1986 | Strait, Jr. | 350/96.20 X |

FOREIGN PATENT DOCUMENTS

| | | |
|---|---|---|
| 0028790 | 5/1981 | European Pat. Off. . |
| 52-77736 | 6/1977 | Japan . |
| 2019028 | 10/1979 | United Kingdom . |
| 1580061 | 11/1980 | United Kingdom . |
| 1585766 | 3/1981 | United Kingdom . |
| 1596227 | 8/1981 | United Kingdom . |

OTHER PUBLICATIONS

Ross W. Strait, Jr., "Discussion of the Development of a Practical Multi-Mode Fiber Optic Connector Embodying a Mechanical Clamp and Featuring Low Installation Time", *Times Fiber Communications, Inc.*

Primary Examiner—William L. Sikes
Assistant Examiner—Akm E. Ullah
Attorney, Agent, or Firm—Bacon & Thomas

[57] ABSTRACT

A device for connecting two optical fibers is disclosed. The connector enables two optical fibers to be coupled in a precise manner which minimizes losses at the connection interface and enables the ends of the optical fibers to be protected when the connection is severed. The connector uses axial and radial alignment means to provide precision alignment of the coupled optical fibers.

9 Claims, 11 Drawing Figures

OPTICAL FIBER CONNECTOR

CROSS REFERENCE TO RELATED APPLICATION

This application is a continuation-in-part of co-pending U.S. patent application Ser. No. 503,165, filed June 10, 1983 now U.S. Pat. No. 4,614,401.

BACKGROUND OF THE INVENTION

1. Technical Field of the Invention

This invention is directed to a connector for precision coupling of optical fibers.

2. Description of the Prior ARt

Optical fiber connectors are devices used to connect two or more optical fibers in a fiber optic transmission system. When two optical fibers are connected, attenuation of the optical signal at the connection inevitably occurs. To minimize this attenuation, a connector for optical fibers must precisely align the two fibers so that the axis of the transmitting fiber is coincident with the axis of the receiving fiber and the ends of each fiber are precisely adjacent to one another. The connector design must have means to preclude radial misaligment, angular misalignment and axial separation of the transmitting and receiving fibers. In addition to providing precise spatial alignment, the connector design must protect the glass fiber from mechanical stress, shock or other physical abuse during assembly, storage, mating and unmating, and usage.

It has been heretofore proposed to align and couple optical fibers in the interstice between three contiguous, elongated, cylindrical rigid pins. For example in U.S. Pat. No. 4,047,796, a connector design is disclosed which employs three contiguous cylindrical rods of equal dimensions, through which two lengths of optical fiber are threaded from opposite ends of the interstice between the rods until they contact. The fibers are aligned and secured in position by means of a clamp which tightens a compression ring at one end of the rod assembly so that the rods engage and secure the fibers in aligment. Other patents, such as U.S. Pat. Nos. 4,061,416 and 4,050,781, disclose similar connectors predicated upon the three rod assembly.

U.S. Pat. No. 4,056,305, discloses an optical fiber connector which utilizes an elastomeric alignment element for aligning two sets of three-rod assemblies each containing an end of an optical fiber.

SUMMARY OF THE INVENTION

The present invention is directed to a connector for coupling two optical fibers in a precise manner that minimizes losses at the connection and that enables the ends of the optical fibers to be protected when the connection is separated.

The connector of the invention is comprised of two connector assemblies. Each connector assembly contains a three-pin sub-assembly to support the end portions of optical fiber that extend from the ends of the fiber optic cable to be coupled. Each three-pin sub-assembly comprises three parallel, contiguous, like-size pins that are precisely dimensioned so that when they are rigidly secured together in a contiguous relationship a precisely defined elongated chamber extends axially through the central space between the pins. Each end portion of optical fiber to be coupled extends through the respective chamber in each sub-assembly and terminates precisely at the proximal ends of the pins which partially protrude from each connector assembly.

The pins comprising each sub-assembly are rigidly secured together in a contiguous relationship to define the chamber for receiving a length of optical fiber in each connector assembly by first retaining means. Second retaining means is provided in each connector assembly for providing a stress relieving space adjacent to the distal ends of the three-pin sub-assembly. Spring-loaded retaining means is provided in each connector assembly to securely fix the axial position of each optical fiber within the chamber defined by the three pins in each sub-assembly. The spring-loaded retaining means is preferably positioned in each connector assembly behind the second retaining means which abuts the distal ends of the three-pin sub-assembly.

Two connector assemblies are connected by means of first alignment means which is adapted to by threadedly joined to the coupling means of each connector assembly. The first alignment means includes abutment means which abuts against the first retaining means when the connector assemblies are coupled together. Second alignment means is provided for securely retaining the portions of the three-pin sub-assemblies in contiguous relationship when the connected assemblies are coupled.

The combination of the first and second retaining means, the spring-loaded retaining means and the first and second alignment means provides secure and precise axial, radial and angular alignment of the optical fibers extending through each chamber defined by the internal circumference of each three-pin sub-assembly when the connector assemblies are brought together and coupled.

Because each optical fiber is securely maintained in its own connector assembly, the connection can be repeatedly coupled and uncoupled without fear of damaging the fragile glass fiber. The invention, therefore, contemplates a connector structure for enabling the fiber supporting chambers in each sub-assembly to be accurately aligned and supported at the point where the fiber lengths terminate, while still permitting the connection to be readily and repeatedly separated and reconnected without disturbing the precise nature of the coupling between the ends of the optical fiber. In addition, by virtue of a special tool, the optical fiber can be readily loaded and unloaded from the connector structure.

BRIEF DESCRIPTION OF THE DRAWINGS

FIG. 6 is a perspective view with portions cut away of the coupling sleeve containing an abutment washer and alignment sleeve.

DETAILED DESCRIPTION OF THE PREFERRED EMBODIMENTS

Figure 1:
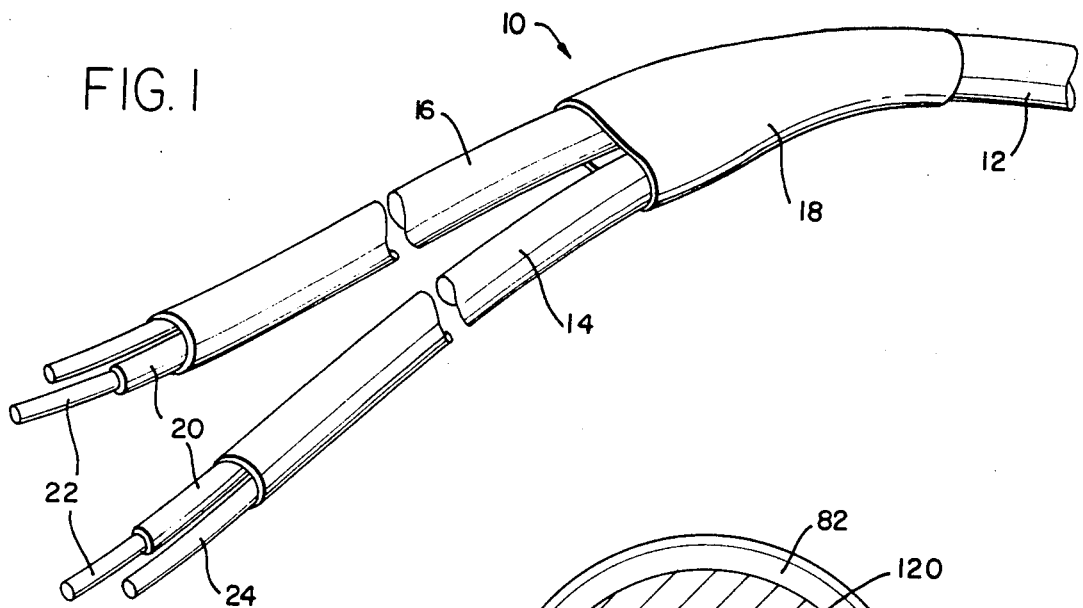
FIG. 1 is a perspective view of a fiber optic cable with various sections of its protective sheath removed.

Referring to FIG. 1, reference numeral 10 shows, in general, a fiber optic cable which has been prepared for use in conjunction with a connector assembly of the invention. The cable 10 has a first protective sheath 12, which encloses a plurality of fiber optic cables. The protective sheath is typically made from a thermoplastic polymeric material. In partial preparation for inserting one of the optical fibers into a connector assembly, as explained below, a portion of the first protective sheath 12 has been stripped away and a brass sleeve element 18 has been positioned so that one end of the element 18 is in contact with the first protective sheath 12 and the opposite end of the element surrounds the ends of the second protective sheaths 14 and 16 which are installed for individual protection of the optical fibers during the connector installation. Interiorly of the protective sheaths 14 and 16 are strength members 24, one for each fiber optic cable. The strength members are typically metallic such as steel, but may also be made from polymeric materials. The strength members 24 are colinearly aligned with optical fiber 22 in order to provide strength and rigidity to the arrangement and protect the fragile glass fiber. The optical fibers 22 are further enclosed by a protective buffer layer 20.

A basic element of a connector assembly of the invention comprises three, like-size, contiguous, rigid pins referred to as a three-pin sub-assembly. The pins are held in position in a connector assembly by first retaining means. The first retaining means for the pins is preferably a rigid, generally cylindrical shaped metal sleeve which surrounds the distal portion of the pins and secures them in a tight, contiguous relationship by exerting a radially compressive force on the pins. The pins may be press fitted in direct contact with the first retaining means or press fitted within third retaining means which is, in turn, press fitted into the first retaining means.

The second retaining means is preferably a rigid metal bushing shaped and positioned so as to provide a stress relieving space for the optical fiber adjacent to the distal end of the three-pin sub-assembly. There are one three-pin sub-assembly and first and second retainining means in each connector assembly in the invention.

In each connector assembly, the optical fiber is fitted into the intersticial chamber between the three pins of the sub-assembly. The diameter of the chamber is defined by the diameter of the inscribed circle tangent to the circumference of each of the three pins. Because the diameter of the chamber is determined by the diameter of the pins, any diameter optical fiber can be accommodated by careful selection of the diameter of the pins.

Spring-loaded retaining means, preferably in the form of a spring-biased sliding ring surrounding three rigid, generally arcuate shaped collect sectors, is provided in each connector assembly for securing the optical fiber within the intersticial chamber by preventing axial movement of the fiber within the chamber.

Each connector assembly additionally contains coupling means which enables it to be securely coupled to another connector assembly in such a manner that the proximal ends of each three-pin sub-assembly are precisely aligned. Additionally, each connector assembly may contain means to thread the optical fiber into the sub-assembly and to hold and protect the various retaining means.

Two connector assemblies are coupled together to align the ends of their respective optical fibers by connecting each coupling means to a first alignment means. The connector assemblies enter the alignment means from opposite ends and abut against abutment means contained within the first alignment means. To secure the portions of the three-pin sub-assembly which protrude from each assembly, second alignment means is provided which retains the protruding portions of each three-pin sub-assembly in a tight contiguous relationship by exerting a radially compressive force on the protruding pins.

Figure 2:
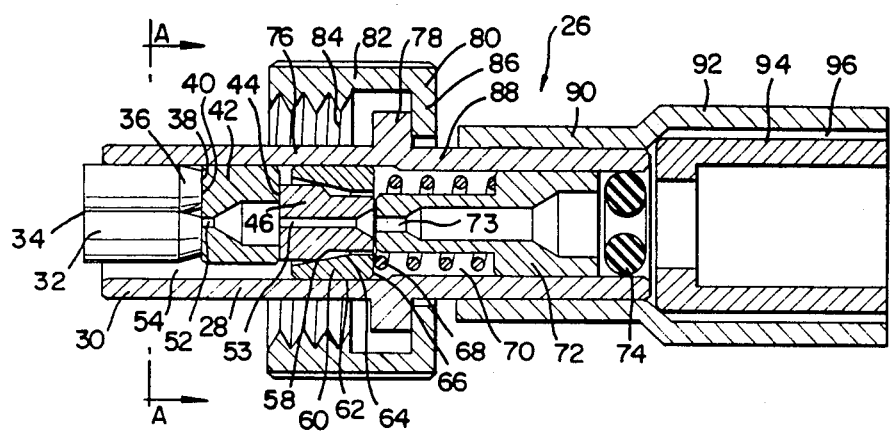
FIG. 2 is a cross-sectional view of a connector assembly designed in accordance with the invention.

FIG. 2 shows a connector assembly of the invention, generally at 26. A metal sleeve 28 is provided with a front portion 30 for housing and retaining the distal portion of three-pin sub-assembly 32 which defines an intersticial chamber 34 for receiving and protecting an optical fiber inserted therein. The proximal ends of the pins protrude from the end portion 30 of the metal sleeve 28. The distal end 36 of each pin is tapered so as to assist in guiding the optical fiber 22 when it is threaded into the connector assembly through intersticial chamber 34. The end face 38 of at least one pin of the three-pin sub-assembly 32 is in a flush, abutting arrangement with the first end face 40 of three-pin lead in bushing 42. The other end face 44 of the three-pin lead in bushing is in flush, abutting relationship with three collect sectors 46.

Figure 3:
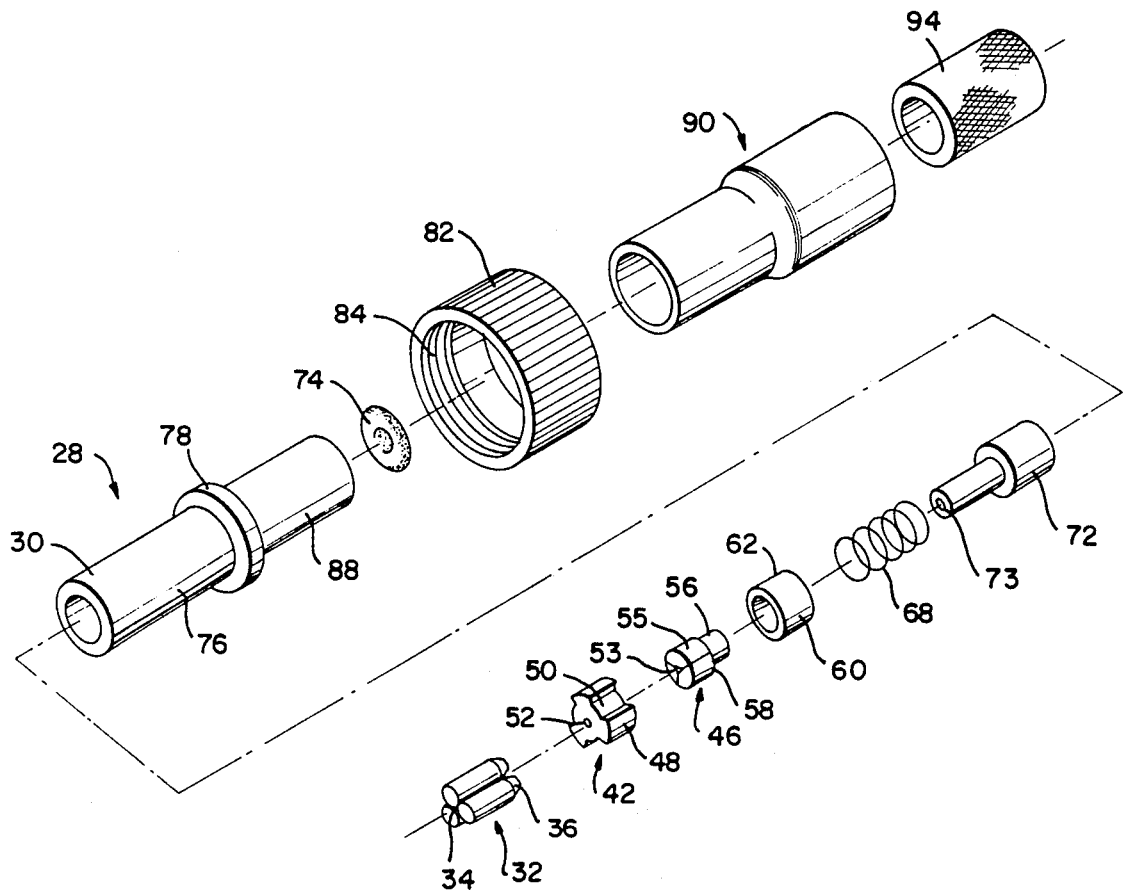
FIG. 3 is an exploded view of the connector assembly designed in accordance with the invention.

Referring to FIG. 3, the three-pin lead in bushing 42, is shown to be generally cylindrically shaped with three arcuate-shaped flanges 48 protruding longitudinally along the circumference 50 of the bushing at angles of 120°. The center of the bushing 52 is hollow to provide a chamber for passage of the optical fiber. The diameter of the center is larger than the diameter of the optical fiber to aid in relieving stresses on the fiber.

The three-pin lead in bushing is positioned in the connector assembly shown in FIG. 2, such that each flange 48 is press fitted against metal sleeve 28 and is flush against one of the pins 32 in the three-pin sub-assembly. This results in three passages 54 bounded by metal sleeve 28, pins 32 and the circumference of the three-pin lead in bushing 50. These passages provide access to the inner portion of the connector assembly for releasing the optical fiber, as described hereinafter.

Referring again to FIG. 3, the collect sectors 46 are shown to be three identical, rigid metal bodies which are arcuate in cross-section, defining an arc of slightly less than 120°. Each sector contains a longitudinal groove 53 at the center of the arc which defines the passageway for the optical fiber when the sectors are assembled contiguously as shown in FIG. 3. The sectors further comprise front portion 55 and rear portion 56. Front portion 55 is of a larger diameter than rear portion 56, thereby forming shoulder 58.

In the connector assembly shown in FIG. 2, the collect sectors are placed in contiguous arrangement so that the longitudinal groove 53 aligns with passages 34 and 52 through the three-pin sub-assembly and three-pin lead in bushing. The sectors are disposed within sliding ring 60, the outer surface of which 62 is in sliding engagement with the inner surface of metal sleeve 28. The inner surface 64 of the sliding ring is tapered and in sliding engagement with shoulder 58 of the collect sectors. The base of the sliding ring 66 is in contact with spring 68 which is disposed within a cavity 70 defined by metal sleeve 28 and the front portion of bushing 72 which is smaller in diameter than the rear portion of this bushing. Bushing 72 is provided with a central longitudinal cavity 73 which aligns with the cavity formed by grooves 53 in the adjacent collect sector assembly. The rear portion of bushing 72 is press fitted within metal sleeve 28 and supported by an elastomeric O-ring which is also press fitted into metal sleeve 28. In this state, spring 68 pushes against the base of the sliding ring 66, driving the ring forward in sliding engagement with shoulders 58 of the collect sectors 46. Because the inner wall of the ring 64 is tapered and gradually thickens toward the base of the ring, and because the rear face of the three-pin lead in bushing limits forward movement of collect sectors, the collect sectors are forced radially inward as the ring slides forward. This causes the diameter of passage 53 to be reduced until it equals the outer diameter of the optical fiber. The collect sectors, thus, clamp down on the optical fiber and are held in this position by the force of the spring on the sliding ring. In this manner, the optical fiber is held in place within the connector assembly.

The metal sleeve 28 has a forward end portion 76 which extends rearwardly to an increased diameter portion 78 which extends circumferentially outwardly and serves as a stop member for a coupling nut 80. The coupling nut 80 has a front cylindrical portion 82 provided with internal threads 84 adapted to threadedly engage a threaded member of a first alignment means in the form of a coupling sleeve, as explained hereinafter. The rear portion of the coupling nut has a downwardly extending flange 86, an inner face of which will contact the upwardly extending shoulder 78 of the sleeve 28 so as to limit axial movement of the nut 80 towards the front face 76 of the sleeve 28. A reduced diameter portion of the sleeve 88 extends rearwardly from the shoulder 78 and is received within crimp sleeve 90. The front portion of the crimp sleeve 90 is of slightly smaller inside diameter than the outside diameter of the reduced portion 88 of the sleeve 28 so that the sleeve can be tightly press fitted within the front portion of the crimp sleeve.

The remainder of the crimp sleeve 92 is of a larger diameter to accommodate crimp ferrule 94 and provide annular space 96 therebetween which is designed to receive one or more strength members such as the steel strength member 24 of the optical fiber cable depicted in FIG. 1 in the manner described below.

Figure 4:
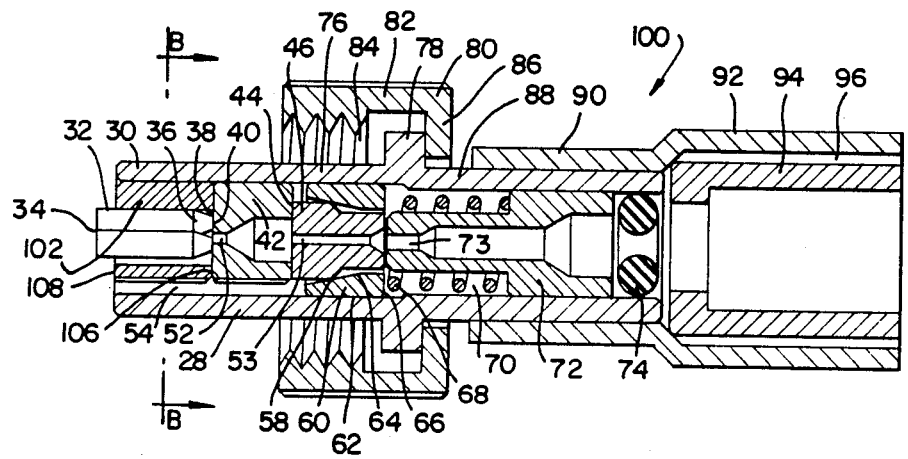
FIG. 4 is a cross-sectional view of another connector assembly designed in accordance with the invention.

FIG. 4 depicts, in cross-section, another connector assembly in accordance with the invention, generally at 100. Reference may be made to the foregoing discussion of FIGS. 2 and 3 for a description of like parts and elements which will be designated by the same reference numerals as shown in FIGS. 2 and 3. Accordingly, the discussion of FIG. 4 is limited to those parts and elements which differ in structure and/or function from those described with respect to FIGS. 2 and 3.

In this connector assembly, the distal ends of three-pin sub-assembly 32 is retained within three-pin holder bushing 102. The use of the holder bushing is necessary to retain smaller diameter optical fiber which require small diameter pins in the three-pin sub-assembly. By using the holder bushing, the same connector assembly can be used with smaller diameter pins. The structure of the three-pin hold bushing is quite similar to that of three-pin lead in bushing 42 except that the hollow center 104 is dimensioned to receive and retain the distal portion of the three-pin sub-assembly in tight, contiguous relationship by exerting a radially compressive force thereon. The distal end face of the holder bushing 106 is in flush abutting relationship with end face 40 of three-pin lead in bushing 42. The other end face 108 of the holder bushing is flush with the end of the front portion 30 of metal sleeve 28.

Figure 5:
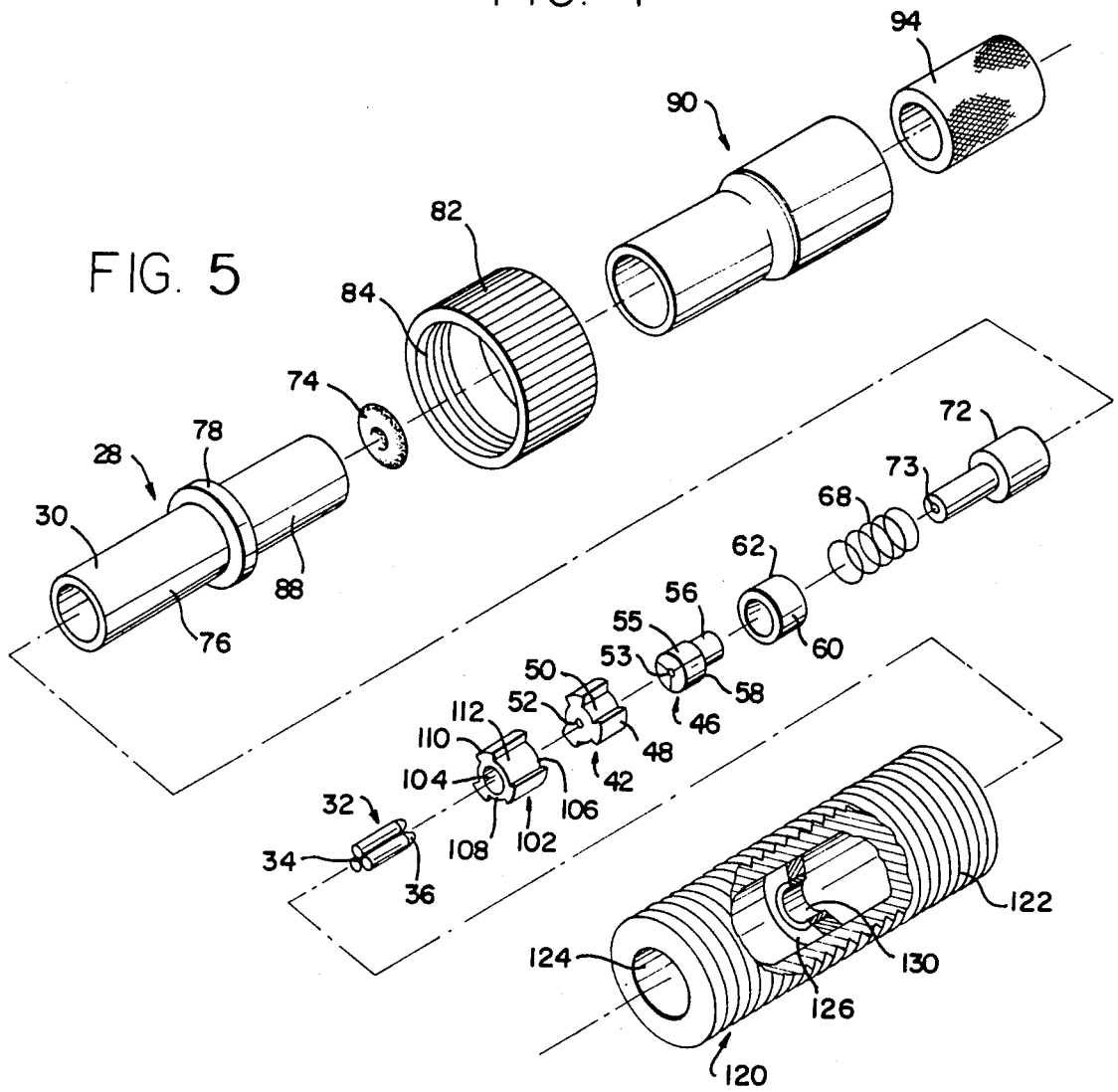
FIG. 5 is an exploded view of the connector assembly shown in FIG. 4.

Referring to FIG. 5, the holder bushing 102 is shown to be generally cylindrically shaped with three arcuate shaped flanges 110 protruding longitudinally along the circumference 112 of the bushing at angles of 120°. The center of the bushing 104 is hollow and dimensioned to receive and return a three-pin sub-assembly.

The holder bushing is positioned in the connector assembly shown in FIG. 4, such that each flange 110 is press fitted against metal sleeve 28 flush against three-pin lead in bushing 42 so that its other end face 108 terminates precisely at the end of the front portion 30 of metal sleeve 28. Each flange 110 is positioned so that it corresponds in position and abuts a flange 48 of the three-pin lead in bushing 42. This results in three passageways 54 bounded by metal sleeve 28 and the circumferences of the holder bushing 112 and lead in bushing 50. These passages provide access to the inner portion of the connector assembly for releasing the optical fiber, as described hereinafter.

FIG. 6 shows a coupling sleeve used to couple two connector assemblies together, generally at 120. The coupling sleeve is tubular with threads 122 along its outer circumference. The inner circumference 124 is smooth having an inner diameter just slightly greater than the outer diameter of metal sleeve 28 of the connector assembly. An abutment washer 126 is positioned in the center of the coupling sleeve to provide precise angular alignment and final end separation of the coupled connector assemblies.

Also shown in FIG. 6 is alignment sleeve 130. The alignment sleeve is made of a rigid, but deformable material such as metal, having an inner diameter which is slightly less than the circumscribed circle about the three pins so that when it is pushed into the protruding portion of a three-pin sub-assembly, it deforms slightly and applies a radially compressive force on the pins.

Figure 7:
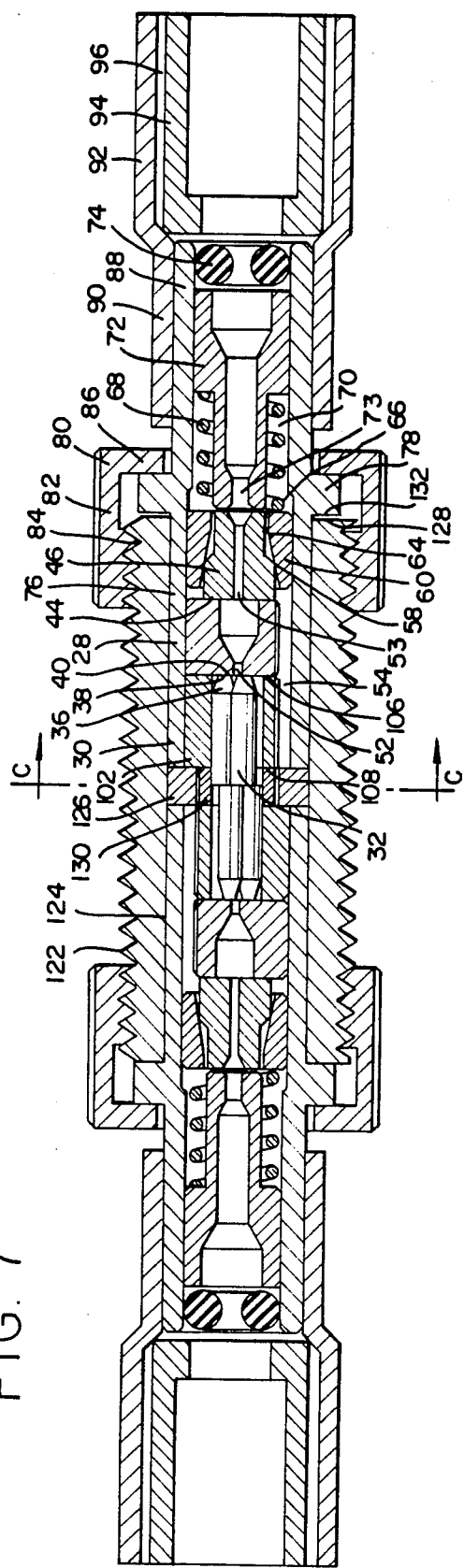
FIG. 7 is a cross-sectional view of two mated connector assemblies including coupling and alignment sleeves.

FIG. 7 shows two connector assemblies (individually depicted in FIGS. 4 and 5) mated. Threads 122 of coupling sleeve 120 are threadedly engaged with threads 84 of coupling nuts 82. When the coupling nuts are engaged with the coupling sleeve and tightened, the front portions 30 of metal sleeves 28 move towards one another along the interior wall 124 of the coupling sleeve, until they abut against the abutment washer 126. The abutment washer prevents the coupling nuts from being tightened further, even though there is free space between the end faces of the coupling sleeve 128 and front faces 132 of shoulders 78 of metal sleeves 28. Abutment in this manner provides final angular alignment and end separation of the optical fiber contained in each connect assembly.

Prior to engaging the coupling sleeve, alignment sleeve 130 is fitted over the protruding portion of one three-pin sub-assembly. When the connector assemblies are coupled by threading the coupling sleeve into the coupling nuts, the protruding portion of the other three-pin sub-assembly is fitted within the alignment sleeve. This provides final radial alignment of the optical fibers contained in each connector assembly.

Figure 8:
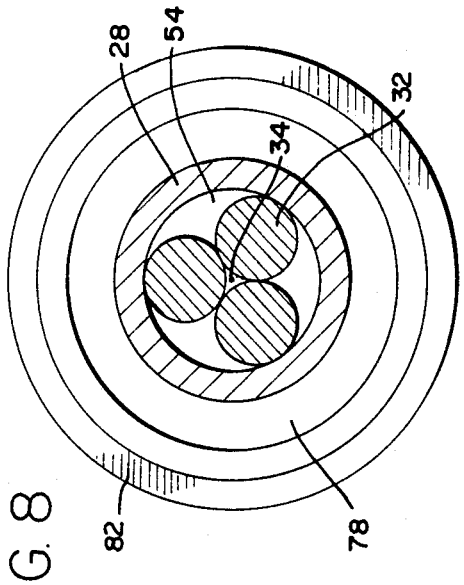
FIG. 8 is an end view taken along line A—A of FIG. 2.

FIG. 8 is an end view taken along line A—A looking to the right in FIG. 2. FIG. 8 shows the compact concentricity of the connector assembly with intersticial chamber 34 of three-pin sub-assembly 32 provided for an optical fiber. Passages 54 provide access to the sliding ring 60 for releasing the optical fiber as described below.

Figure 9:
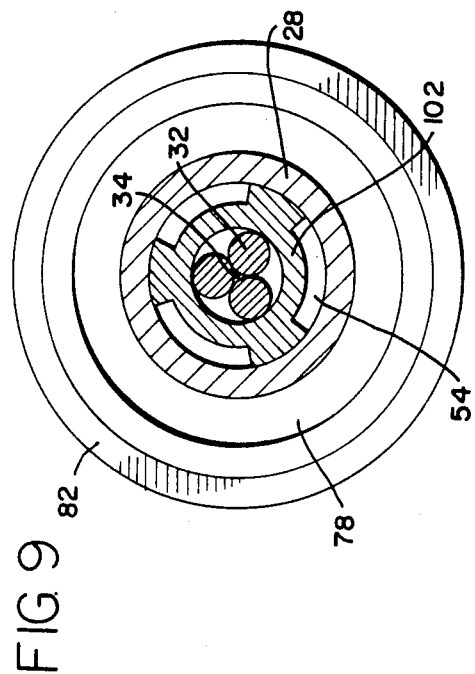
FIG. 9 is an end view taken along line B—B of FIG. 4.

FIG. 9 is an end view taken along line B—B, looking to the right, in FIG. 4. The elements shown in this figure correspond to those shown in FIG. 8, with the exception of three-pin holder bushing 102 which permits small pins and hence small optical fiber to be retained by the connector assembly.

Figure 10:
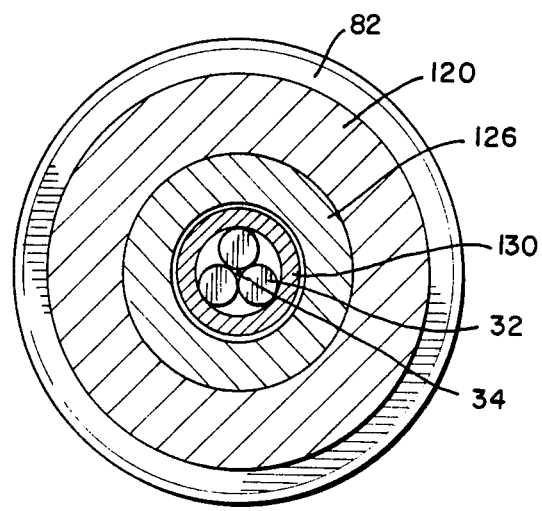
FIG. 10 is an end view taken along line C—C of FIG. 7.

FIG. 10 is an end view taken along line C—C, looking right, in FIG. 7. In addition to the intersticial chamber 34 defined by the three-pin sub-assembly 32, this Figure shows alignment sleeve 130, abutment washer 126, coupling sleeve 120, and coupling nut 82.

Figure 11:
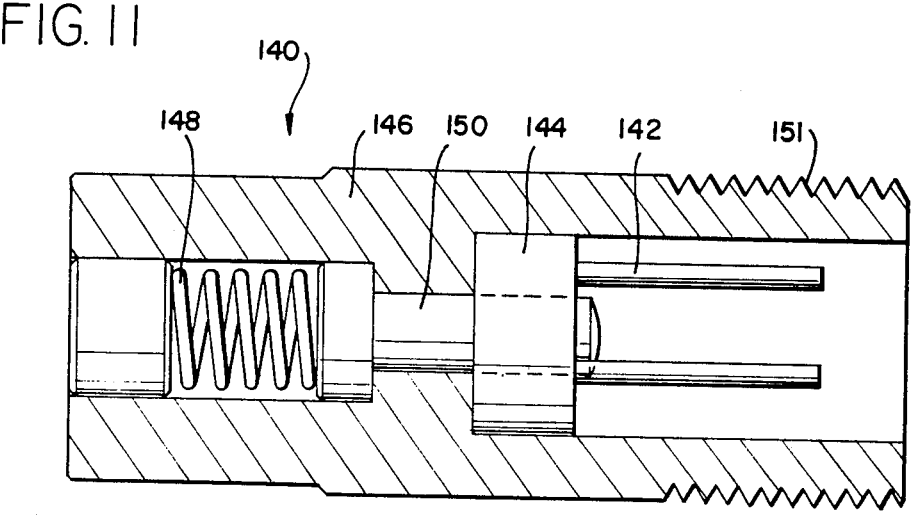
FIG. 11 is a cross-sectional view of a tool designed to release the spring-loaded retaining means of connector assemblies designed in accordance with the invention.

FIG. 11, shows a tool designed to open the spring-loaded retaining means formed by the collect sectors, sliding ring and spring so that an optical fiber may be inserted into or removed from a connector assembly. The essential elements of the tool 140 are one or more prongs 142 protruding from a flat washer 144. The prongs are sized, shaped and positioned on the washer 144 so that they can be inserted into a connector assembly from the front so that the prongs enter the three interstices 54 defined by the three-pin sub-assembly and three-pin alignment bushing and sleeve (see, e.g. FIG. 2) or the three-pin holder bushing and three-pin alignment bushing and sleeve (see, e.g. FIG. 4). The tool is preferably disposed within a housing 146 which may be provided with a spring 148 and sliding stop 150. The housing 146 has threads 151 which engage the coupling nut 80 on assembly 26 as the tool 140 is installed onto assembly 26. The prongs 142 are pushed against the sliding ring 60 by the housing 146.

In use, the prongs extend into the front of the connector past the three-pin sub-assembly and three-pin lead in busing until they contact the forward surface of the sliding ring. When the tool is pressed further into the connector, the sliding ring is pushed back, thereby removing the radial force on the collect sectors and expanding the passageway formed by groove 53 so that an optical fiber can be freely removed therefrom or inserted therethrough. When an optical fiber has been positioned in the connector assembly with the collect sectors loose, the clamp mechanism is reactivated by withdrawing the three-pronged tool from the front of the connector. Without the counter force of the three-pronged tool, the spring 68 pushes the sliding ring forward, driving the collect sectors forward until they abut the rear surface of the three-pin lead in bushing and then radially inward agasint the optical fiber. The spring 148 and sliding stop 150 comprise means which locate the end of the fiber 22 very slightly recessed behind the proximal end of the three-pin sub-assembly 32, even as the tool 140 is being withdrawn from the connector assembly.

The spring face, the tapered angle of the inner wall of the sliding ring, the radius of the longitudinal groove in the collect sector which contacts the optical fiber, the length of the collect sectors and the coefficient of friction between the collect sectors and the glass fiber may be adjusted to create a retention force sufficient to hold optical fiber of a variety of diameters in place in the connector assembly without creating sufficient stress to break the fiber.

In order to prepare optical fiber 10 of FIG. 1 for connection with the assemblies 26 and 100 of FIGS. 2 and 4, respectively, the following procedure is preferred. Cable 12 is first cut so that an end face (not shown) is prepared with all components flush with each other. The outer protective sheath is removed over a predetermined length exposing the buffered optical fibers 22 and the cable strength members 24. The brass sleeve element 18 is installed over the fibers and strength members and is pushed onto the cable until the end of the protective sheath 12 hits a stop inside the brass sleeve element. A preformed V-shaped tube is installed with one fiber and one strength member passing through each leg of the V-shaped tube. The tube is pushed on until it bottoms against a stop in the brass sleeve element 18, as shown in FIG. 1. The legs of the V-shaped tube are shown as protective sheaths 14 and 16 in FIG. 1. The length of protective sheaths 14 nd 16 is predetermined so that the appropriate length of buffered fiber and strength member protrudes from each protective sheath 14 and 16.

Each optical fiber is now ready for connection to a connector assembly. For each of explanation, the connection will be described with reference to optical cable element 14 and connector assembly 26 shown in FIG. 2 since it is understood that an identical procedure is employed to connect optical cable element 16 and any number of other optical cable elements with a connector assembly.

A crimp ferrule 94 is positioned over the end of cable element 14 with buffered optical fiber 22 and strength member 24 protruding through it. The strength member 24 is then bent back over the outer surface of the crimp ferrule 94. The buffered optical fiber is coated with a protective silicone grease. This grease is removed from the exposed fiber by wiping it off and cleaning the wiped surface of the fiber with a solvent. All but a short length of the exposed buffer 20 is removed from the fiber. The fiber is cleaved at a predetermined length. Tool 140 is installed onto assembly 26 by threadedly engaging the end of tool housing 146 into coupling nut 80 with care to guide the prongs 142 into the interstices 54 as previously described.

The prepared optical fiber 22 is inserted into the connector assembly, onto which tool 140 has been installed, by guiding it through the opened end of the crimp sleeve 92 and the O-ring 74. The fiber is pushed into the connector assembly until the crimp ferrule on the end of the protective sheath 14 bottoms against the distal end of sleeve 28. The end of the optical fiber has now been fed through passages 73,53, 52, and 34, and the stop tool 140 positions the end of the fiber very slightly recessed behind the proximal end of the three-pin sub-assembly. The end of the optical fiber rests against stop tool 150 because of the predetermined length to which is was cleaved.

The tool 140 is removed from the connector assembly by threadedly disengaging the coupling nut 80 from the tool housing 146. This withdraws the spring-actuator prong(s) 142 and allows the collect sectors to clamp down on the optical fiber as previously described. The axial location of the optical fiber is in this manner fixed relative to the connector assembly.

To complete the connection of the connector assembly 26 to the fiber optic cable, the large end of the crimp sleeve 92 is crimped onto the crimp ferrule 94, thereby capturing the cable strength member 24 and insuring a rugged optical splice.

A separate optical cable may be similarly positioned within a like connector assembly and the two assemblies may then be joined by applying the alignment sleeve to one protruding portion of the three-pin sub-assembly and connecting the two assemblies via a coupling sleeve, as previously described, to provide an optical fiber connector which connects two fiber optic cables with minimal optical loss, e.g., about 2 db or less.

While the present invention has been described in terms of certain preferred embodiments, one skilled in the art will readily appreciate that various modifications, changes, omissions and substitutions may be made without departing from the spirit thereof. It is intended, therefore, that the present invention be limited solely by the scope of the following claims.

I claim:

1. A connector for coupling the ends of two lengths of optical fiber in contiguous, aligned position comprising:
   (i) two connector assemblies, each connector assembly comprising:
       (a) a three-pin sub-assembly comprising three like-size, generally cylindrical, rigid pins extending parallel to each other in contiguous relationship, said pins having a diameter such that an inscribed circle extending tangent to the pin circumferences in the interior space between the pins substantially corresponds to the diameter of a length of optical fiber, said three-pin, sub-assembly partially protruding from the proximal end of said connector assembly;
       (b) first retaining means surrounding the non-protruding portion of said three-pin sub-assembly for securely retaining the pins of the sub-assembly in contiguous relationship, the interior space extending between the circumferences of the pins defining a chamber for receiving a length of optical fiber;
       (c) second retaining means for providing a stress relieving space for the optical fiber adjacent to the distal end of the three-pin sub-assembly;
       (d) spring-loaded retaining means for securing an optical fiber within the chamber defined by the three pins of the sub-assembly by exertion of a radial compressive force on said optical fiber; and
       (e) coupling means for connecting the connector assembly to its mating connector assembly;
   (ii) first alignment means for connecting the coupling means of each connector assembly and including abutment means which abuts against the first retaining means of each connector assembly when they are connected by said alignment means; and
   (iii) second alignment means for securely retaining the protruding portions of each three-pin sub-assembly in contiguous relationship when the connector assemblies are connected by said first alignment means.

2. A connector according to claim 1, wherein said first retaining means comprises a rigid metal sleeve circumferentially surrounding said pins and exerting a radial comprissive force on said pins.

3. A connector according to claim 1, wherein said second retaining means comprises a bushing having a first end portion in abutting relationship with the distal end of at least one of said pins.

4. A connector according to claim 1, wherein said spring-loaded retaining means comprises three like-size, arcuate shaped, rigid bodies extending parallel to each other in contiguous relationship, each of said bodies having a longitudinal groove running along the center of the arc defined by the body, thereby forming a central cylindrical longitudinal opening between said bodies and having a shoulder extending around the circumference of the body, said bodies being disposed within a spring-biased sliding ring which exerts a radial compressive force on the shoulders of said bodies forcing them radially inward.

5. A connector according to claim 1, wherein said first alignment means comprises a hollow, cylindrical, threaded metal sleeve which is adapted to be threadedly engaged with the coupling means of each connector assembly.

6. A connector according to claim 5, wherein said abutment means in said first alignment means comprises a washer which is press fitted within said hollow, cylindrical threaded metal sleeve.

7. A connector according to claim 1, wherein said second alignment means is a metal sleeve adapted to fit over the protruding portions of each three-pin sub-assembly.

8. A connector according to claim 1, further comprising third retaining means for retaining said three-pin sub-assembly with said first retaining means.

9. A connector according to claim 1, wherein each connector assembly contains a length of optical fiber disposed within said chamber defined by the circumferences of the three pins.

* * * * *